US012558988B2

(12) United States Patent
Lucas

(10) Patent No.: US 12,558,988 B2
(45) Date of Patent: Feb. 24, 2026

(54) METHOD FOR CONTROL OF A SYSTEM OF CHARGING POINTS COMPOSED OF AT LEAST TWO CHARGING POINTS AND A CHARGING POINT FOR USE IN A SYSTEM OF CHARGING POINTS

(71) Applicants: AUDI AG, Ingolstadt (DE); VOLKSWAGEN AG, Wolfsburg (DE)

(72) Inventor: Christian Lucas, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 517 days.

(21) Appl. No.: 18/005,492

(22) PCT Filed: Sep. 24, 2021

(86) PCT No.: PCT/EP2021/076310
§ 371 (c)(1),
(2) Date: Jan. 13, 2023

(87) PCT Pub. No.: WO2022/069356
PCT Pub. Date: Apr. 7, 2022

(65) Prior Publication Data
US 2023/0249574 A1      Aug. 10, 2023

(30) Foreign Application Priority Data

Sep. 29, 2020     (DE) ..................... 10 2020 125 374.5

(51) Int. Cl.
*H02J 7/00*          (2006.01)
*B60L 53/53*        (2019.01)
(Continued)

(52) U.S. Cl.
CPC ............... *B60L 53/67* (2019.02); *B60L 53/53* (2019.02); *B60L 53/54* (2019.02); *B60L 53/62* (2019.02);
(Continued)

(58) Field of Classification Search
CPC .......... B60L 53/53; B60L 53/54; B60L 53/62; B60L 53/67; H01M 8/04947; H01M 2008/1293; H01M 2250/10
(Continued)

(56) References Cited

U.S. PATENT DOCUMENTS 9,255,971 B2 *    2/2016   Hu ...................... G01R 31/3835
10,620,273 B2 *   4/2020   Tang .................. G01R 31/3646
(Continued)

FOREIGN PATENT DOCUMENTS

CN          104393626 A      3/2015
DE      102019201712 A1      8/2020
(Continued)

OTHER PUBLICATIONS

International Search Report, mailed Dec. 3, 2021, for International Patent Application No. PCT/EP2021/076310. (2 pages).
(Continued)

*Primary Examiner* — Alexis B Pacheco
(74) *Attorney, Agent, or Firm* — Seed Intellectual Property Law Group LLP

(57) ABSTRACT

A method is provided for control of a system of charging points composed of at least two charging points, each of which is outfitted with at least one solid oxide fuel cell and with a high-voltage battery electrically connected or electrically connectible to the solid oxide fuel cell, where the charging points are adapted to provide electrical charging current via a converter at an interface for connection to a battery operated consumer. The method includes: checking the state of charge of the high-voltage battery of a first charging point by which the electric energy will be provided for charging the consumer via the interface, charging the high-voltage battery of the first charging point, and possibly that of the consumer, by a current-generating operation of
(Continued)

the solid oxide fuel cell of the first charging point, if the state of charge of the high-voltage battery of the first charging point has fallen below a first limit value, and charging the high-voltage battery of the first charging point by means of an electric current provided by a second charging point if the state of charge of the high-voltage battery has fallen below a second limit value, located below the first limit value.

10 Claims, 3 Drawing Sheets

(51) Int. Cl.
B60L 53/54 (2019.01)
B60L 53/62 (2019.01)
B60L 53/67 (2019.01)
H01M 8/04858 (2016.01)
H02J 7/14 (2006.01)
*H01M 8/12* (2016.01)

(52) U.S. Cl.
CPC ................. *H01M 8/04947* (2013.01); *H01M 2008/1293* (2013.01); *H01M 2250/10* (2013.01)

(58) Field of Classification Search
USPC ........................................... 320/134
See application file for complete search history.

(56) References Cited

U.S. PATENT DOCUMENTS

| | | | | |
|---|---|---|---|---|
| 2012/0105069 A1* | 5/2012 | Wang | .................... | G01R 31/392 |
| | | | | 324/427 |
| 2012/0326668 A1 | 12/2012 | Ballatine et al. | | |
| 2015/0168498 A1* | 6/2015 | Hwang | .............. | G01R 31/3842 |
| | | | | 702/63 |
| 2017/0115355 A1* | 4/2017 | Willard | .............. | G01R 31/3648 |
| 2017/0212203 A1* | 7/2017 | Young | ................. | H01M 10/345 |
| 2018/0031642 A1* | 2/2018 | Sung | .................... | G01R 31/367 |
| 2018/0328995 A1* | 11/2018 | Kondo | .................. | H01M 10/48 |

FOREIGN PATENT DOCUMENTS

| | | |
|---|---|---|
| EP | 3726691 A1 | 10/2020 |
| JP | 2005019182 A | 1/2005 |
| KR | 100963529 B1 | 6/2010 |
| WO | WO 2020062956 A1 | 4/2020 |

OTHER PUBLICATIONS

Written Opinion of the International Searching Authority, dated Dec. 3, 2021, for International Patent Application No. PCT/EP2021/076310. (6 pages).

* cited by examiner

METHOD FOR CONTROL OF A SYSTEM OF CHARGING POINTS COMPOSED OF AT LEAST TWO CHARGING POINTS AND A CHARGING POINT FOR USE IN A SYSTEM OF CHARGING POINTS

BACKGROUND

Technical Field

Embodiments of the invention relate to a method for control of a system of charging points composed of at least two charging points.

Description of the Related Art

Fuel cells serve for providing electric energy in a chemical reaction between a hydrogen-containing fuel and an oxygen-containing oxidizing agent, generally air. In a solid oxide fuel cell (SOFC) there is an electrolyte layer of a solid material, giving the cell its name, such as ceramic yttrium-doped zirconium dioxide, which is capable of conducting oxygen atoms, while electrons are not conducted. The electrolyte layer is contained between two electrode layers, namely, the cathode layer, to which air is supplied, and the anode layer, which is supplied with the fuel, which can be formed by $H_2$, CO, $CH_4$ or similar hydrocarbons. If air is led through the cathode layer to the electrolyte layer, the oxygen takes up two electrons and the resulting oxygen ions $O^{2-}$ move through the electrolyte layer to the anode layer, where the oxygen ions react with the fuel to form water and $CO_2$. At the cathode side, the following reaction occurs: $\frac{1}{2}O_2 + 2e^- \rightarrow 2O^{2-}$ (reduction/electron uptake). At the anode, the following reactions occur: $H_2 + O^{2-} \rightarrow H_2O + 2e^-$ and $CO + O^{2-} \rightarrow CO_2 + 2e^-$ (oxidation/electron surrender)

Solid oxide fuel cells require high temperatures over 700° C., at which they are operated.

With the increasing numbers of fuel cell vehicles, an increasing number of charging points are needed at strategically favorable locations, such as a supermarket parking lot. However, the power grids are not designed for such services. Alternatively, the possibility exists of arranging a solid oxide fuel cell to generate the electric current in the charging points, whose fuel can be supplied by a gas network, especially one for natural gas, because the capacity of the gas network is sufficient for the energy transport. This solid oxide fuel cell produces a large amount of waste heat.

In KR 100 963 529 B1 there is described a charging station with battery charging device and a control method which minimizes the cycles of switching a fuel cell on and off during the charging of multiple electric vehicles. CN 104 393 626 A1 discloses a charging station which is operated with a solid oxide fuel cell. A system composed of multiple fuel cells switched in parallel for the supplying of an electrical load is known from JP 2005 019 182 A.

BRIEF SUMMARY

Some embodiments include a method for control of a system of charging points composed of at least two charging points, each of which is outfitted with at least one solid oxide fuel cell and with a high-voltage battery electrically connected or electrically connectible to the solid oxide fuel cell, wherein the charging points are adapted to provide electrical charging current via a converter at an interface for connection to a battery operated consumer, involving the steps:

checking the state of charge of the high-voltage battery of a first charging point by which the electric energy will be provided for charging the consumer via the interface, charging the high-voltage battery of the first charging point, and possibly that of the consumer, by a current-generating operation of the solid oxide fuel cell of the first charging point, if the state of charge of the high-voltage battery of the first charging point has fallen below a first limit value, and charging the high-voltage battery of the first charging point by means of an electric current provided by a second charging point if the state of charge of the high-voltage battery has fallen below a second limit value, located below the first limit value.

Some embodiments provide a method for minimizing the energy loss caused by the heating of the solid oxide fuel cell in a charging station by interconnecting several charging points. Some embodiments include a charging point for a system of charging points to carry out this method.

In some embodiments, a method may be characterized in that at least two charging points having a solid oxide fuel cell are used in a system of charging points, wherein the solid oxide fuel cells are electrically connected or electrically connectible to the high-voltage batteries, and wherein the state of charge of a first charging point is checked, the high-voltage battery of the first charging point is charged as soon as the state of charge has fallen below a first limit value, and the high-voltage battery of the first charging point is charged by means of a second charging point if the state of charge of the high-voltage battery has fallen below a second limit value. The energy loss due to the frequent heating of the high-temperature fuel cell, designed as a solid oxide fuel cell, of the respective charging point can be minimized by an intelligent electrical interconnection of several such charging points, so that the efficiency of the fuel cells used is boosted.

It may be advantageous for the electric current provided by the second charging point to be generated by the at least one solid oxide fuel cell of the second charging point. The precondition for this can be that the temperature of the solid oxide fuel cell of the second charging point has a minimum temperature, or else a charging will also be done through the high-voltage battery of the second charging point. This increases the charging energy of a charging point in event of an unequal distribution of the utilization, since the solid oxide fuel cell does not need to be heated separately.

It may be advantageous for there to be more than two charging points present in the system of charging points, and for the high-voltage battery of the first charging point to be supplied with the electric current of the solid oxide fuel cell of the charging point at which the at least one solid oxide fuel cell is in operation and which has a given minimum temperature. This enables a choice of an already "warm" solid oxide fuel cell, thus avoiding losses for the heating of the "colder" solid oxide fuel cell.

Moreover, it may be advantageous for more than two charging points to be present in the system of charging points, for the high-voltage battery of the first charging point in a resting state to be charged fully by the solid oxide fuel cell of the first charging point, for the charging point of the system of charging points to then be identified whose high-voltage battery has the lowest state of charge, and for this high-voltage battery to be charged with the electric current of the first charging point that is generated by the at least one solid oxide fuel cell, so that the entire system of charging points can be utilized more economically.

It is furthermore advisable to switch off the at least one solid oxide fuel cell of the first charging point if it is found that the high-voltage batteries of all other charging points of the system of charging points have a state of charge which has reached or gone beyond the first limit value, thus balancing out unequal states of charge.

Moreover, it may be advantageous in event of falling below the first limit value at the first charging point to identify that charging point whose high-voltage battery is closest to reaching or going beyond the first limit value, and the electric power of the solid oxide fuel cell of this charging point is used to recharge the first charging point. However, it is also possible to first fully charge this charging point and then the first charging point will be charged with a lower state of charge. Good thermal utilization of the solid oxide fuel cell is possible in this way, since the starting and heating losses are minimized.

Alternatively, it is possible in event of falling below the first limit value at the first charging point and with the solid oxide fuel cell switched off at all other charging points to identify that charging point whose solid oxide fuel cell is the warmest, and then this solid oxide fuel cell is first switched on and then used for recharging the high-voltage battery of the first charging point. By using the warmest solid oxide fuel cell for the charging of the high-voltage battery, a frequent heating of all the solid oxide fuel cells can be avoided, which means a longer service life and lower investment costs for the system of charging points.

It is furthermore advisable for the first limit value to lie in a range of 60 to 80 percent of a total battery capacity. In this way, the charging point does not need to be recharged at once or permanently. This may be advantageous due to the heating energy required for the solid oxide fuel cell, since it will only carry out a (delayed) recharging if it has an efficiency-optimized operating temperature.

It may be advantageous for an operationally secure charging of a consumer for the second limit value to lie in a range of 40 to 50 percent of a total battery capacity. For safety reasons and to avoid a deep discharge of the high-voltage battery it is advisable to establish a third limit value, which lies in a range of 15 to 20 percent of the total battery capacity.

Furthermore, a charging point is proposed, comprising a high-voltage battery and at least one solid oxide fuel cell which is connected or connectible across a DC converter, wherein the high-voltage battery and/or the solid oxide fuel cell are connected or connectible across a converter to an interface order to connect and recharge a battery-operated consumer. The charging point is characterized in particular in that a further electrical interface is present at the battery side of the DC converter for the electrical connection of a further charging point, a first switch is incorporated in a connection going to the further electrical interface for the electrical connection or the electrical disconnection of the further charging point, and a second switch is present on the battery side for the electrical connection or the electrical disconnection of the high-voltage battery of the connection going to the further electrical interface. This affords the benefit that a fuel cell which is still active or which has a minimum temperature can be used for the charging of a high-voltage battery of another charging point, so that heating losses are reduced. The benefits, embodiments, and effects explained in connection with the method described herein hold equally for the charging point described herein.

The features and combinations of features mentioned above in the description and the features and combinations of features mentioned below in the description of the figures and/or shown solely in the figures can be used not only in the particular indicated combination, but also in other combinations or standing alone. Thus, embodiments which are not shown explicitly or explained in the figures, yet which can be created and emerge from separated combinations of features from the explained embodiments should be viewed as also being disclosed and encompassed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
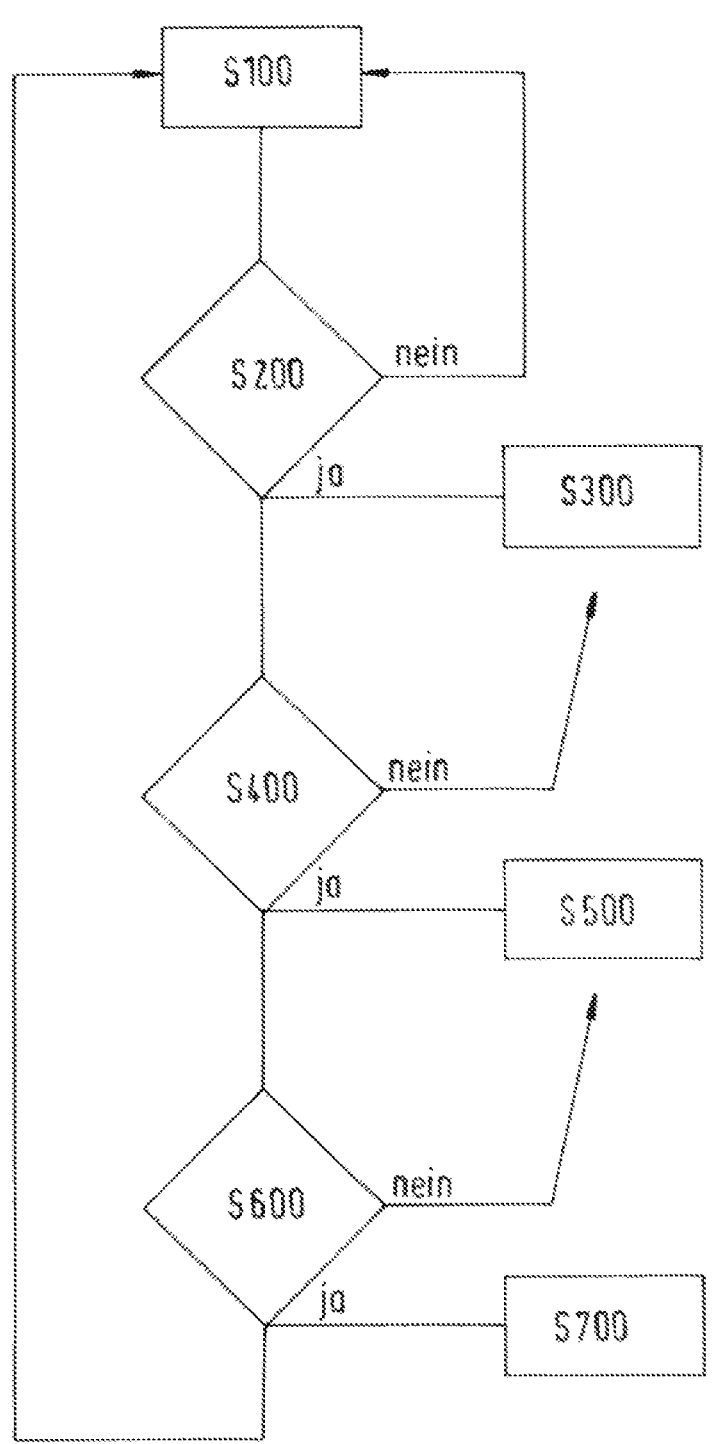
FIG. 1 shows a schematic operation of a system of charging points to carry out a method.

FIG. 1 shows a schematic sequence of a method for control of a system of charging points 10, wherein first of all the state of charge of a high-voltage battery 12 of a first charging point 8 is checked (S100). If the state of charge of the high-voltage battery 12 of the first charging point 8 has fallen below a first limit value, located for example in a range of 60 to 80 percent of a total battery capacity (S200), the high-voltage battery 12 is charged by a solid oxide fuel cell 1 of the first charging point 8 (S300). Optionally, the battery of a consumer 13 connected to the first charging point 8 will likewise be charged. Alternatively, in event of falling below the first limit value by the high-voltage battery 12 of the first charging point 8, it is possible to check whether other high-voltage batteries of other charging points are fully or almost fully charged, and whether the solid oxide fuel cell of one of the other charging points is available for a recharging of the first point, being still "warm" and therefore able to carry out the recharging with better efficiency.

If the state of charge of the high-voltage battery 12 has fallen below a second limit value, which lies for example in a range of 40 to 50 percent of the total battery capacity (S400), the high-voltage battery 12 of the first charging point 8 will be charged by means of an electrical current provided by a second charging point 9 (S500). The electrical current so provided will be provided by the solid oxide fuel cell 2 of the second charging point 9. If the state of charge of the high-voltage battery 12 has fallen below a third limit value, which lies for example in a range of 15 to 20 percent of the total battery capacity (S600), the high-voltage battery 12 of the first charging point 8 will be charged by means of solid oxide fuel cells of several other charging points (S700).

Figure 2:
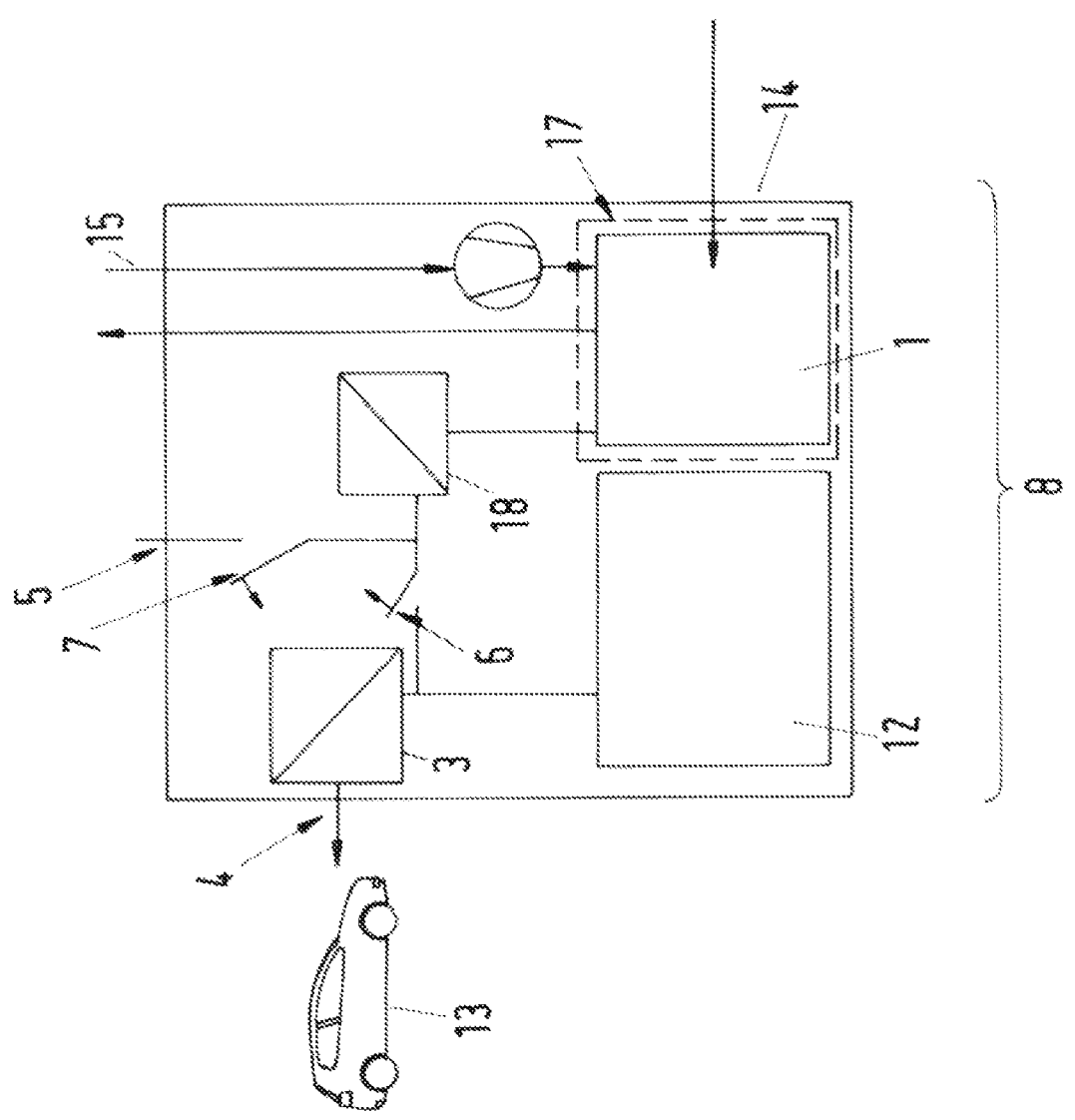
FIG. 2 shows a schematic representation of a charging point for the system of charging points.

FIG. 2 shows a schematic representation of the first charging point 8 for a battery-operated motor vehicle 13, while a hybrid vehicle can also be included in this definition. All further charging points of the system of charging points 10 may have the identical layout. The charging point 8 contains a solid oxide fuel cell 1, which utilizes a fuel 14, such as natural gas provided from a natural gas network, to generate electrical current for the charging of the high-voltage battery 12 and/or the battery of a consumer 13 (such as an electric motor vehicle). In the charging point 8, the high-voltage battery 12 is electrically connected across a DC converter 18 to the solid oxide fuel cell 1, while the high-voltage battery 12 and/or the solid oxide fuel cell 1 is connected or can be connected across a converter 3 to an interface 4. At the battery side of the DC converter 18 there is a further electrical interface 5 for the electrical connection of a further charging point 9 of the system of charging points 10, while a first switch 6 for the electrical connection or the electrical disconnection of the further charging point 9 is incorporated in a connection going to the further electrical interface 5. At the battery side, furthermore, there is a second switch 7 for the electrical connection or the electrical disconnection of the high-voltage battery 12 from the connection going to the further electrical interface 5, in order to selectively couple the high-voltage battery electrically with the further second charging point 9 or with its own solid oxide fuel cell 1.

Figure 3:
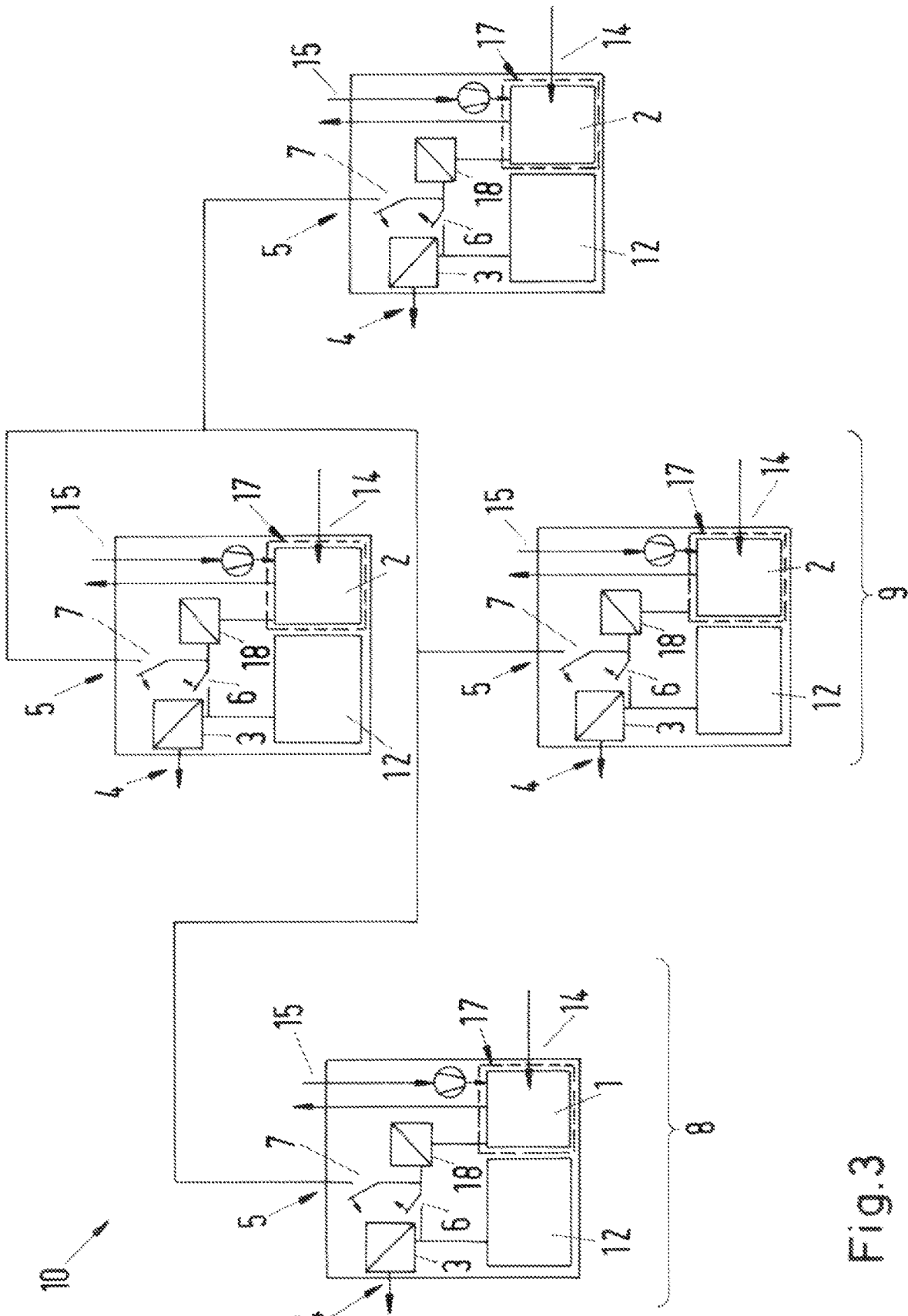
FIG. 3 shows a schematic representation of the system of charging points formed from multiple charging points.

FIG. 3 shows a schematic layout of a system of charging points 10. If the state of charge of the high-voltage battery 12 of the first charging point 8 falls below a first limit value, the high-voltage battery 12 will be charged by the solid oxide fuel cell 1 of the first charging point 8. If the state of charge of the high-voltage battery 12 of the first charging point 8 falls below a second limit value, lying below the first limit value, the high-voltage battery 12 of the first charging point 8 will be charged with electric current by means of a solid oxide fuel cell 2 of the second charging point 9. The first charging point 8 will be electrically powered by the charging point at which the at least one solid oxide fuel cell 2 is in operation and/or which has a given minimum temperature, so that heating losses can be avoided.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for control of a system of charging points composed of at least two charging points, each of which is outfitted with at least one solid oxide fuel cell and with a high-voltage battery electrically connected or electrically connectible to the solid oxide fuel cell, wherein the charging points are adapted to provide electrical charging current via a converter at an interface for connection to a battery operated consumer, the method comprising:

checking the state of charge of the high-voltage battery of a first charging point by which the electric energy will be provided for charging the consumer via the interface;

charging the high-voltage battery of the first charging point, and possibly that of the consumer, by a current-generating operation of the solid oxide fuel cell of the first charging point, if the state of charge of the high-voltage battery of the first charging point has fallen below a first limit value; and charging the high-voltage battery of the first charging point by an electric current provided by a second charging point if the state of charge of the high-voltage battery has fallen below a second limit value, located below the first limit value.

2. The method according to claim 1, wherein the electric current provided by the second charging point is generated by the at least one solid oxide fuel cell of the second charging point.

3. The method according to claim 1, wherein more than two charging points are present in the system of charging points, and the high-voltage battery of the first charging point is supplied with the electric current of the solid oxide fuel cell of the charging point at which the at least one solid oxide fuel cell is in operation and which has a given minimum temperature.

4. The method according to claim 1, wherein more than two charging points are present in the system of charging points, the high-voltage battery of the first charging point in a resting state is charged fully by the solid oxide fuel cell of the first charging point, then the charging point of the system of charging points is identified whose high-voltage battery has the lowest state of charge, and this high-voltage battery is charged with the electric current of the first charging point that is generated by the at least one solid oxide fuel cell.

5. The method according to claim 1, wherein the at least one solid oxide fuel cell of the first charging point is switched off if it is found that the high-voltage batteries of all other charging points of the system of charging points have a state of charge which has reached or gone beyond the first limit value.

6. The method according to claim 1, wherein in event of falling below the first limit value at the first charging point, that charging point is identified whose high-voltage battery is closest to reaching or going beyond the first limit value, and the electric power of the solid oxide fuel cell of this charging point is used to recharge the first charging point.

7. The method according to claim 1, wherein in event of falling below the first limit value at the first charging point and with the solid oxide fuel cell switched off at all other charging points, that charging point is identified whose solid oxide fuel cell is the warmest, and then this solid oxide fuel cell is first switched on and then used for recharging the high-voltage battery of the first charging point.

8. The method according to claim 1, wherein the first limit value lies in a range of 60 to 80 percent of a total battery capacity.

9. The method according to claim 1, wherein the second limit value lies in a range of 40 to 50 percent of a total battery capacity.

10. A charging point for use in a system of charging points set up to carry out a method for control of the system, where each charging point is outfitted with at least one solid oxide fuel cell and with a high-voltage battery electrically connected or electrically connectible to the solid oxide fuel cell, wherein the charging points are adapted to provide electrical charging current via a converter at an interface for connection to a battery operated consumer, and where the method includes checking the state of charge of the high-voltage battery of a first charging point by which the electric energy will be provided for charging the consumer via the interface, charging the high-voltage battery of the first charging point, and possibly that of the consumer, by a current-generating operation of the solid oxide fuel cell of the first charging point, if the state of charge of the high-voltage battery of the first charging point has fallen below a first limit value, and charging the high-voltage battery of the first charging point by means of an electric current provided by a second charging point if the state of charge of the high-voltage battery has fallen below a second limit value, located below the first limit value, the charging point comprising:

a high-voltage battery and at least one solid oxide fuel cell which is connected or connectible across a DC converter, wherein the high-voltage battery and/or the solid oxide fuel cell are connected or connectible across a converter to an interface in order to connect and recharge a battery-operated consumer,

wherein a further electrical interface is present at the battery side of the DC converter for the electrical connection of a further charging point, a first switch is incorporated in a connection going to the further electrical interface for the electrical connection or the electrical disconnection of the further charging point, and a second switch is present on the battery side for the electrical connection or the electrical disconnection of the high-voltage battery of the connection going to the further electrical interface.

* * * * *